United States Patent
Kaes et al.

(10) Patent No.: US 12,285,976 B2
(45) Date of Patent: Apr. 29, 2025

(54) TIRE COMPRISING A DUAL-LAYER TREAD

(71) Applicant: The Goodyear Tire & Rubber Company, Akron, OH (US)

(72) Inventors: Christian Jean-Marie Kaes, Schrondweiler (LU); Steve Ludwig, Butzbach (DE); Anna Katharina Bier, Hanau (DE); Gary Terence Barrett, West Midlands (GB); Bjoern Springer, Bruchköbel (DE); Richard Cox, Birmingham (GB); Kimia Ekramzadeh, Hanau (DE)

(73) Assignee: THE GOODYEAR TIRE & RUBBER COMPANY, Akron, OH (US)

( * ) Notice: Subject to any disclaimer, the term of this patent is extended or adjusted under 35 U.S.C. 154(b) by 0 days.

(21) Appl. No.: 18/362,497

(22) Filed: Jul. 31, 2023

(65) Prior Publication Data

US 2025/0042202 A1    Feb. 6, 2025

(51) Int. Cl.
    *B60C 11/00*    (2006.01)
(52) U.S. Cl.
    CPC ........ *B60C 11/005* (2013.01); *B60C 11/0008* (2013.01); *B60C 2011/0025* (2013.01)
(58) Field of Classification Search
    CPC .............. B60C 11/005; B60C 11/0041; B60C 11/0008; B60C 2011/0025; B60C 1/0016
    See application file for complete search history.

(56) References Cited

U.S. PATENT DOCUMENTS

2022/0063340 A1    3/2022   Phillipson et al.

FOREIGN PATENT DOCUMENTS

| EP | 0104133 | A2 |   | 3/1984 |           |
|----|---------|----|---|--------|-----------|
| EP | 2452834 | A2 |   | 5/2012 |           |
| EP | 2492115 | A2 |   | 8/2012 |           |
| EP | 3960500 | A1 |   | 3/2022 |           |
| EP | 4134248 | A1 | * | 2/2023 | ........... B60C 11/005 |
| JP | 63134311| A  | * | 6/1988 |           |
| JP | 2011001521 | A | * | 1/2011 |           |
| JP | 2015030387 | A | * | 2/2015 |           |
| WO | 0037270 | A1 |   | 6/2000 |           |

OTHER PUBLICATIONS

Extended European Search Report for Application No. 24191078.5, dated Feb. 14, 2025.

* cited by examiner

*Primary Examiner* — Cedrick S Williams
(74) *Attorney, Agent, or Firm* — Katherine A. Smith

(57) ABSTRACT

The present invention relates to pneumatic tires comprising a dual-layer tread made of a first layer comprising a first tread compound having a first tread property and a second layer comprising a second tread compound having a second tread property.

17 Claims, 3 Drawing Sheets

US 12,285,976 B2

TIRE COMPRISING A DUAL-LAYER TREAD

FIELD OF THE INVENTION

The present invention relates to pneumatic tires comprising a dual-layer tread made of a first layer comprising a first tread compound having a first tread property and a second layer comprising a second tread compound having a second tread property.

BACKGROUND OF THE INVENTION

For racing, the properties of the tires are very specific in order to meet the different weather conditions. The shape of the tread of the pneumatic tire for racing is different than for passenger cars for example. The properties of interest for racing are wet traction, dry traction, tread wear, thermal conductivity and electrical conductivity. In particular, it is important to achieve fast and efficient heat build-up of tread compound in tires for racing. Indeed, racing tires are heated via heating jacket for example, in order to be within their operating/performing temperature window. This permits to improve its performances such as grip on the track. For obvious environmental reasons, the use of such heating jacket should be diminished or even stopped.

Therefore, there is clearly a need to provide improved tread compounds which are able to achieve improved heat build-up without the use of external heating source under dry and/or wet conditions.

SUMMARY OF THE INVENTION

Therefore, the present invention relates to a pneumatic tire comprising a tread with a ground engaging surface, the tread being a dual-layer tread made of
  a first layer comprising a first tread compound having a loss compliance LC(1);
  a second layer comprising a second tread compound having a loss compliance LC(2);
wherein both of the loss compliance LC(1) and LC(2) are determined by a dynamic mechanical analysis system at a frequency of 10 Hz, under pre-strain of 10% and dynamic strain of 2.5% within a temperature sweep from 0 to 130° C.;
wherein, when the tread temperature is in the range of from 5 to 50° C., LC(1)>LC(2);
wherein the volume ratio of the second tread compound relative to the first tread compound in the tread is in the range of from 0.5:1 to 10:1.

The present invention further relates to a pneumatic tire comprising a tread with a ground engaging surface, the tread being a dual-layer tread made of
  a first layer comprising a first tread compound having a loss modulus E"(1);
  a second layer comprising a second tread compound having a loss modulus E"(2);
wherein both of the loss modulus E"(1) and E"(2) are determined by a dynamic mechanical analysis (DMA) system at a frequency of 10 Hz, under pre-strain of 10% and dynamic strain of 2.5%, within a temperature sweep from 0 to 130° C.;
wherein, when the tread temperature is in the range of from 0 to 20° C., E"(1)>E"(2);
wherein the volume ratio of the second tread compound relative to the first tread compound in the tread is in the range of from 0.5:1 to 10:1.

DEFINITIONS

"loss compliance" or "LC" is the ratio of E" relative to $(E^*)^2$. $LC=E"/(E^*)^2$. A higher loss compliance value indicates that the material is more compliant and able to dissipate more energy, such as generating heat, when subjected to mechanical stress. E" stands for the loss modulus, $E^*=\sqrt{(E'+E")}$ stand for Young's complex modulus and E' stands for the storage modulus. In the context of the present invention, the loss compliance LC is determined by a dynamic mechanical analysis (DMA) system at a frequency of 10 Hz, under pre-strain of 10% and dynamic strain of 2.5%, at a temperature sweep from 0 to 130° C. The DMA system is a machine called EPLEXOR® 150N from the company Netzsch.

E" is the loss modulus and is determined by a dynamic mechanical analysis (DMA) system at a frequency of 10 Hz, under pre-strain of 10% and dynamic strain of 2.5%, at a temperature sweep from 0 to 130° C. The DMA system is a machine called EPLEXOR® 150N from the company Netzsch.

"glass-transition temperature" or "Tg" of a material, in the present case a polymer, is the temperature region of the change from a rigid "glassy" state to a flexible "rubbery" state of said polymer. Tg is determined as a peak midpoint by a differential scanning calorimeter (DSC) at a temperature rate of increase of 20° C. per minute, according to ASTM D3418 or equivalent. In the context of the present invention, Tg is measured by EPLEXOR® equipment at 10% pre-stain and 0.25% amplitude at temperature sweep from −80 to 40° C., the Tg being determined by the maximum value of tan delta=E"/E'.

In the context of the present invention, the term "operating window" refers to the optimum temperature range (not too cold and not too hot) for which pneumatic racing tires have ultimate grip without triggering excessive tire degradation and/or loss in ultimate grip.

BRIEF DESCRIPTION OF DRAWINGS

The invention will be described by way of example and with reference to the accompanying drawings in which.

DETAILED DESCRIPTION OF THE INVENTION

Figure 1:
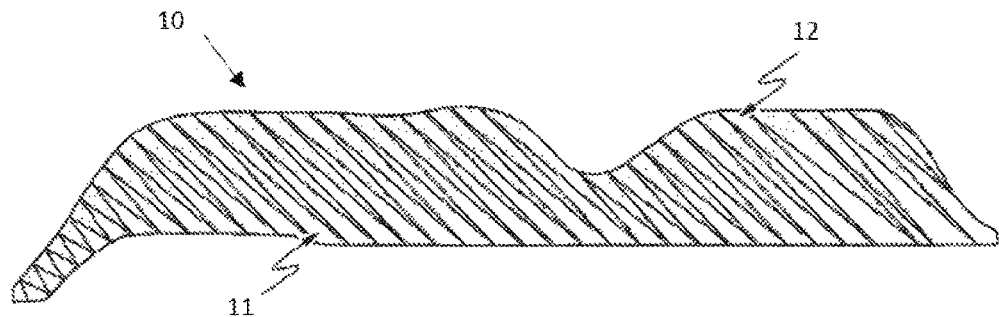
FIG. 1 is a schematic representation of a portion of a dual-layer tread 10 comprised in a pneumatic tire according to the present invention.

The present invention relates to a pneumatic tire comprising a tread with a ground engaging surface, the tread being a dual-layer tread made of
  a first layer comprising a first tread compound having a loss compliance LC(1);
  a second layer comprising a second tread compound having a loss compliance LC(2);
wherein both of the loss compliance LC(1) and LC(2) are determined by a dynamic mechanical analysis system at a frequency of 10 Hz, under pre-strain of 10% and dynamic strain of 2.5% within a temperature sweep from 0 to 130° C.; wherein, when the tread temperature is in the range of from 5 to 50° C., LC(1)>LC(2);

wherein the volume ratio of the second tread compound relative to the first tread compound in the tread is in the range of from 0.5:1 to 10:1.

Preferably, the second tread compound is a polymeric compound having a glass-transition temperature Tg(2) in the range of from −10 to 15° C., more preferably in the range of from −5 to 15° C., more preferably of in the range of from −5 to 10° C.

Preferably, the first tread compound is a polymeric compound having a glass-transition temperature Tg(1) in the range of from −25 to +10° C., more preferably in the range of from −20 to +5° C., more preferably of in the range of from −18 to +3° C.

Preferably, the dry traction of the second tread compound is higher than the dry traction of the first tread compound.

Preferably, the pneumatic tire has an operating window in the range of from 80 to 120° C.

Preferably, the pneumatic tire is adapted for dry conditions. Preferably, the pneumatic tire is to be used under dry conditions.

Preferably, the minimum ratio of LC(1) relative to LC(2), at is of about 1.15:1, more preferably of about 1.2:1. Preferably, the maximum ratio of LC(1) relative to LC(2) is of about 4:1, more preferably of about 3:1.

The present invention further relates to a pneumatic tire comprising a tread with a ground engaging surface, the tread being a dual-layer tread made of
  a first layer comprising a first tread compound having a loss modulus E"(1);
  a second layer comprising a second tread compound having a loss modulus E"(2);
wherein both of the loss modulus E"(1) and E"(2) are determined by a dynamic mechanical analysis (DMA) system at a frequency of 10 Hz, under pre-strain of 10% and dynamic strain of 2.5%, within a temperature sweep from 0 to 130° C.;
wherein, when the tread temperature is in the range of from 0 to 20° C., E"(1)>E"(2);
wherein the volume ratio of the second tread compound relative to the first tread compound in the tread is in the range of from 0.5:1 to 10:1.

Preferably, the second tread compound is a polymeric compound having a glass-transition temperature Tg(2) in the range of from −20 to 0° C., more preferably in the range of from −15 to −1° C., more preferably of in the range of from −10 to −3° C.

Preferably, the first tread compound is a polymeric compound having a glass-transition temperature Tg(1) in the range of from 0 to 10° C., more preferably in the range of from 0 to 5° C., more preferably of in the range of from 1 to 4° C.

Preferably, Tg(1)>Tg(2).

Preferably, the wet traction of the second tread compound is higher than the wet traction of the first tread compound.

Preferably, the pneumatic tire has an operating window in the range of from 20 to 70° C.

Preferably, the pneumatic tire is adapted for wet conditions. Preferably, the pneumatic tire is to be used under wet conditions.

Preferably, the ratio of E"(1) relative to E"(2), E"(1)/E"(2), is in the range of from 1.3:1 to 3:1, more preferably in the range of from 1.5:1 to 2:1.

According to the present invention, thanks to the higher loss compliance or the higher loss modulus of the first layer compared to the second layer of the pneumatic tires according to the present invention, more heat is generated in the first layer compared to the second layer. Hence, the first layer of the pneumatic tires according to the present invention, generating a lot of heat will help the second layer to reach its optimum temperature much quicker than usual, namely in the absence of the first layer.

In the context of the present invention, the first tread compound and the second tread compound differ from each other in physical properties. Further, the first tread compound and the second tread compound differ chemically from one another.

Preferably, the tread is formed by extruding the first tread compound with the second tread compound forming a dual-layer strip.

Preferably, the dual-layer tread is formed by a continuous spiral winding of the dual-layer strip.

Preferably, the tread is formed from a continuous spiral winding of the dual-layer strip onto a tire building drum or a carcass.

Preferably, the width of the dual-layer strip corresponds to the width of the tread of the pneumatic tire. In this configuration (see for example FIG. 3), preferably, the dual-layer strip thickness is (or corresponds to) the thickness of the tread, the thickness of the dual-layer strip being determined by the maximum distance between the outermost surface of the dual-layer strip, namely the ground engaging surface of the tread, and the innermost surface of the dual-layer strip. Preferably, the dual-layer strip has a thickness in the range of from 3 to 6 mm, preferably in the range of from 3.5 to 4.5 mm, the dual-layer strip thickness being the thickness of the tread, the thickness of the dual-layer strip being determined by the maximum distance between the outermost surface of the dual-layer strip, namely the ground engaging surface of the tread, and the innermost surface of the dual-layer strip.

Figure 2:
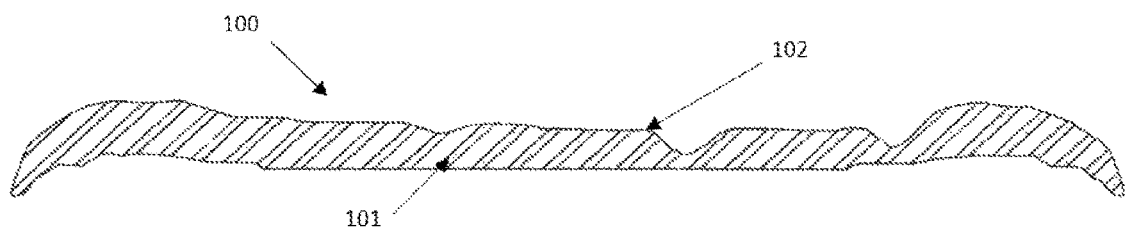
FIG. 2 is a schematic representation of a portion of a dual-layer tread 100 comprised in a pneumatic tire according to the present invention.

Alternatively, preferably, the width of the dual-layer strip < the width of the tread of the pneumatic tire. Indeed, according to said alternative, the dual-layer strip is preferably disposed to form a stack of layers which will form the tread. This alternative is illustrated in FIGS. 1 and 2 for example. Preferably, the dual-layer strip has a thickness in the range of from 1 to 3 mm, more preferably in the range of from 1.5 to 2 mm. Preferably, according to said alternative, the dual-layer strip has a width in the range of from 10 to 25 mm. The shape of the dual-layer strip is for example disclosed in US 2022/0063340A1.

Preferably, the dual-layer tread is formed by extruding the first tread compound and the second tread compound one after the other. More preferably, the dual-layer tread is formed by extruding the first tread compound by spiral winding, forming the first layer of the tread, and then by extruding the second tread compound by spiral winding on the first layer, forming the second layer.

Preferably, the first layer consists of the first tread compound.

Preferably, the second layer consists of the second tread compound.

Preferably, the volume ratio of the second tread compound relative to the first tread compound in the tread is in the range of from 0.60:1 to 10:1, more preferably in the range of from 0.80:1 to 9:1, more preferably in the range of from 0.85:1 to 9:1, more preferably in the range of from 0.9:1 to 8:1.

Preferably, the volume ratio of the second tread compound relative to the first tread compound at the ground engaging surface of the tread is in the range of from 0.60:1 to 10:1, more preferably in the range of from 0.80:1 to 9:1, more preferably in the range of from 0.85:1 to 9:1, more preferably in the range of from 0.9:1 to 8:1.

Preferably, the pneumatic tires according to the present invention are racing tires.

Dual-Layer Strip

Preferably, the cross-sectional shape of the first layer is substantially triangular, more preferably triangular. Preferably, the second layer has an inverted substantially triangular cross-sectional shape compared to the first layer, more preferably an inverted triangular cross-sectional shape compared to the first layer.

Preferably, the volume ratio of the second tread compound relative to the first tread compound in the tread is in the range of from 0.6:1 to 1.5:1, preferably in the range of from 0.85:1 to 1.25:1, more preferably in the range of from 0.9:1 to 1.1:1, more preferably in the range of from 0.95:1 to 1.05:1.

Preferably, the outermost surface of the first layer is a first ground engaging surface and the outermost surface of the second layer being is a second ground engaging surface, the first ground engaging surface and the second ground engaging surface forming the ground engaging surface of the tread. This configuration is illustrated for example by FIG. 1.

Alternatively, preferably, the cross-sectional shape of the first layer is substantially trapezoidal, more preferably trapezoidal.

Preferably, the cross-sectional shape of the second layer is substantially trapezoidal, preferably trapezoidal.

Preferably, the volume ratio of the second tread compound relative to the first tread compound in the tread is in the range of from 2:1 to 9:1, more preferably in the range of from 3:1 to 8:1, more preferably in the range of from 4:1 to 5:1. More preferably, the outermost surface of the first layer is a first ground engaging surface and the outermost surface of the second layer being is a second ground engaging surface, the first ground engaging surface and the second ground engaging surface forming the ground engaging surface of the tread. This configuration is illustrated for example by FIG. 2. Or, preferably, the outermost surface of the second layer is the ground engaging surface of the tread, the first layer not having a ground engaging surface. This configuration is illustrated for example by FIG. 3.

Preferably, the tread has a width in the range of from 130 to 360 mm, more preferably in the range of from 160 to 320 mm. Preferably, the tread has a thickness in the range of from 3 to 6 mm, preferably in the range of from 3.5 to 4.5 mm, the tread thickness being determined by the maximum distance between the outermost surface of the tread, namely the ground engaging surface of the tread, and the innermost surface of the tread.

Preferably, the tread comprises one or more circumferential grooves. Alternatively, preferably, the tread comprises no circumferential grooves.

The present invention is further illustrated by the following set of embodiments and combinations of embodiments resulting from the dependencies and back-references as indicated. In particular, it is noted that in each instance where a range of embodiments is mentioned, for example in the context of a term such as "The pneumatic tire of any one of embodiments 1 to 3", every embodiment in this range is meant to be explicitly disclosed for the skilled person, i.e. the wording of this term is to be understood by the skilled person as being synonymous to "The pneumatic tire of any one of embodiments 1, 2 and 3". Further, it is explicitly noted that the following set of embodiments represents a suitably structured part of the general description directed to preferred aspects of the present invention, and, thus, suitably supports, but does not represent the claims of the present invention.

According to embodiment 1 of the present invention, the pneumatic tire comprises a tread with a ground engaging surface, the tread being a dual-layer tread made of
- a first layer comprising a first tread compound having a loss compliance $LC(1)$;
- a second layer comprising a second tread compound having a loss compliance $LC(2)$;

wherein both of the loss compliance $LC(1)$ and $LC(2)$ are determined by a dynamic mechanical analysis system at a frequency of 10 Hz, under pre-strain of 10% and dynamic strain of 2.5% within a temperature sweep from 0 to 130° C.;

wherein, when the tread temperature is in the range of from 5 to 50° C., $LC(1) > LC(2)$;

wherein the volume ratio of the second tread compound relative to the first tread compound in the tread is in the range of from 0.5:1 to 10:1.

Embodiment 2: The pneumatic tire of embodiment 1, wherein the second tread compound is a polymeric compound having a glass-transition temperature $Tg(2)$ in the range of from −10 to 15° C., preferably in the range of −5 to 15° C., more preferably of in the range of from −5 to 10° C.

Embodiment 3: The pneumatic tire of embodiment 1 or 2, wherein the pneumatic tire is adapted for dry running conditions, preferably the dry traction of the second tread compound is higher than the dry traction of the first tread compound.

Embodiment 4: The pneumatic tire of any one of embodiments 1 to 3, wherein the minimum ratio of $LC(1)$ relative to $LC(2)$, at is of about 1.15:1, preferably of about 1.2:1; wherein the maximum ratio of $LC(1)$ relative to $LC(2)$ is of about 4:1, preferably of about 3:1.

According to embodiment 5 of the present invention, the pneumatic tire comprises a tread with a ground engaging surface, the tread being a dual-layer tread made of
- a first layer comprising a first tread compound having a loss modulus $E''(1)$;
- a second layer comprising a second tread compound having a loss modulus $E''(2)$;

wherein both of the loss modulus $E''(1)$ and $E''(2)$ are determined by a dynamic mechanical analysis (DMA) system at a frequency of 10 Hz, under pre-strain of 10% and dynamic strain of 2.5%, within a temperature sweep from 0 to 130° C.;

wherein, when the tread temperature is in the range of from 0 to 20° C., $E''(1) > E''(2)$;

wherein the volume ratio of the second tread compound relative to the first tread compound in the tread is in the range of from 0.5:1 to 10:1.

Embodiment 6: The pneumatic tire of embodiment 5, wherein the second tread compound is a polymeric compound having a glass-transition temperature $Tg(2)$ in the range of from −20 to 0° C., preferably in the range of from −15 to −1° C., more preferably of in the range of from −10 to −3° C.

Embodiment 7: The pneumatic tire of embodiment 5 or 6, wherein the pneumatic tire is adapted for wet conditions, preferably the wet traction of the second tread compound is higher than the wet traction of the first tread compound.

Embodiment 8: The pneumatic tire of any one of embodiments 5 to 7, wherein the minimum ratio of $E''(1)$ relative to $E''(2)$, $E''(1)/E''(2)$, is of about 1.3:1, preferably of about 1.5:1; wherein the maximum ratio of $E''(1)$ relative to $E''(2)$, $E''(1)/E''(2)$, is of about 3:1, more preferably of about 2:1.

Embodiment 9: The pneumatic tire of any one of embodiments 1 to 8, wherein the tread is formed by extruding the first tread compound with the second tread compound forming a dual-layer strip.

Embodiment 10: The pneumatic tire of embodiment 9, wherein the dual-layer tread is formed by a continuous spiral winding of the dual-layer strip.

Embodiment 11: The pneumatic tire of embodiment 9 or 10, wherein the width of the dual-layer strip corresponds to the width of the tread of the pneumatic tire, wherein preferably, the dual-layer strip thickness is the thickness of the tread, the thickness of the dual-layer strip being determined by the maximum distance between the outermost surface of the dual-layer strip, namely the ground engaging surface of the tread, and the innermost surface of the dual-layer strip, wherein more preferably, the dual-layer strip has a thickness in the range of from 3 to 6 mm, preferably in the range of from 3.5 to 4.5 mm, the dual-layer strip thickness being the thickness of the tread, the thickness of the dual-layer strip being determined by the maximum distance between the outermost surface of the dual-layer strip, namely the ground engaging surface of the tread, and the innermost surface of the dual-layer strip.

Embodiment 12: The pneumatic tire of embodiment 9 or 10, wherein the width of the dual-layer strip < the width of the tread of the pneumatic tire; wherein, preferably, the dual-layer strip has a thickness in the range of from 1 to 3 mm, more preferably in the range of from 1.5 to 2 mm; and/or wherein preferably the dual-layer strip has a width in the range of from 10 to 25 mm.

Embodiment 13: The pneumatic tire of any one of embodiments 1 to 8, wherein the dual-layer tread is formed by extruding the first tread compound and the second tread compound one after the other.

Embodiment 14: The pneumatic tire of any one of embodiments 1 to 13, wherein the first layer consists of (is made of) the first tread compound.

Embodiment 15: The pneumatic tire of any one of embodiments 1 to 14, wherein the second layer consists of (is made of) the second tread compound.

Embodiment 16: The pneumatic tire of any one of embodiments 1 to 15, wherein the volume ratio of the second tread compound relative to the first tread compound in the tread is in the range of from 0.60:1 to 10:1, preferably in the range of from 0.80:1 to 9:1, more preferably in the range of from 0.85:1 to 9:1, more preferably in the range of from 0.9:1 to 8:1; wherein, more preferably, the volume ratio of the second tread compound relative to the first tread compound at the ground engaging surface of the tread is in the range of from 0.60:1 to 10:1, more preferably in the range of from 0.80:1 to 9:1, more preferably in the range of from 0.85:1 to 9:1, more preferably in the range of from 0.9:1 to 8:1.

Embodiment 17: The pneumatic tire of any one of embodiments 1 to 16, being a racing tire.

Embodiment 18: The pneumatic tire of any one of embodiments 1 to 17, wherein the cross-sectional shape of the first layer is substantially triangular, preferably triangular.

Embodiment 19: The pneumatic tire of embodiment 18, wherein the second layer has an inverted substantially triangular cross-sectional shape compared to the first layer, preferably an inverted triangular cross-sectional shape compared to the first layer.

Embodiment 20: The pneumatic tire of embodiment 18 or 19, wherein the volume ratio of the second tread compound relative to the first tread compound in the tread is in the range of from 0.6:1 to 1.5:1, preferably in the range of from 0.85:1 to 1.25:1, more preferably in the range of from 0.9:1 to 1.1:1, more preferably in the range of from 0.95:1 to 1.05:1.

Embodiment 21: The pneumatic of embodiment 20, wherein the outermost surface of the first layer is a first ground engaging surface and the outermost surface of the second layer being is a second ground engaging surface, the first ground engaging surface and the second ground engaging surface forming the ground engaging surface of the tread.

Embodiment 22: The pneumatic tire of any one of embodiments 1 to 17, wherein the cross-sectional shape of the first layer is substantially trapezoidal, preferably trapezoidal.

Embodiment 23: The pneumatic tire of embodiment 22, wherein the cross-sectional shape of the second layer is substantially trapezoidal, preferably trapezoidal.

Embodiment 24: The pneumatic tire of embodiment 22 or 23, wherein the volume ratio of the second tread compound relative to the first tread compound in the tread is in the range of from 2:1 to 9:1, preferably in the range of from 3:1 to 8:1, more preferably in the range of from 4:1 to 5:1.

Embodiment 25: The pneumatic of embodiment 24, wherein the outermost surface of the first layer is a first ground engaging surface and the outermost surface of the second layer being is a second ground engaging surface, the first ground engaging surface and the second ground engaging surface forming the ground engaging surface of the tread.

Embodiment 26: The pneumatic of embodiment 22, wherein the outermost surface of the second layer is the ground engaging surface of the tread, the first layer not having a ground engaging surface.

Embodiment 27: The pneumatic tire of any one of embodiments 1 to 26, wherein the tread comprises one or more circumferential grooves.

Embodiment 28: The pneumatic tire of any one of embodiments 1 to 25, wherein the tread comprises no circumferential grooves.

In the context of the present invention, the tread of the pneumatic tire of the present invention can be prepared according to any method known in the art. In particular, the tread of the pneumatic tire of the present invention can be prepared according to a method as illustrated US 2011/0070325 A1, which is incorporated herewith by reference.

In the context of the present invention, the tread of the pneumatic tire of the present invention can be prepared according to a method as illustrated in US 2022/0063340 A1, which is incorporated herewith by reference. In particular, the present invention further relates to a method of forming a tread comprising the steps of: selecting a first tread compound having a first physical property, such as $LC(1)$ or $E''(1)$, and selecting a second tread compound having a second physical property, such as $LC(2)$ or $E''(2)$, respectively, forming a tread by winding a dual layer strip having a first layer formed of the first tread compound and a second layer formed of the second tread compound, wherein the volume ratio of the second tread compound relative to the first tread compound in the tread is in the range of from 0.5:1 to 10:1. Preferably, in particular for tires under dry conditions, the present invention further relates to a method of forming a tread comprising the steps of: selecting a first tread compound having a loss compliance LC(1), and selecting a second tread compound having a loss compliance LC(2), forming a tread by winding a dual layer strip having a first layer formed of the first tread compound and a second layer formed of the second tread compound, wherein the volume ratio of the second tread compound relative to the first tread compound in the tread is in the range of from 0.5:1 to 10:1, wherein both of the loss compliance LC(1) and LC(2) are determined by a dynamic mechanical analysis system at a frequency of 10 Hz, under pre-strain of 10% and dynamic strain of 2.5% within a temperature sweep from 0 to 130° C.; and wherein, when the tread temperature is in the range of from 5 to 50° C., LC(1)>LC(2). Alternatively, in particular for tire under wet conditions, the present invention further relates to a method of forming a tread comprising the steps of: selecting a first tread compound having a loss modulus E"(1), and selecting a second tread compound having a loss modulus E"(2), forming a tread by winding a dual layer strip having a first layer formed of the first tread compound and a second layer formed of the second tread compound, wherein the volume ratio of the second tread compound relative to the first tread compound in the tread is in the range of from 0.5:1 to 10:1, wherein both of the loss modulus E"(1) and E"(2) are determined as described herein above; and wherein, when the tread temperature is in the range of from 0 to 20° C., E"(1)>E"(2).

For forming the tread comprised in the tire of the present invention, an apparatus as illustrated in US 2022/0063340 A1 can be used. Such apparatus according to the present invention can form the coextruded dual-layer strip while instantaneously varying the volume ratio of the first compound to the second compound. The dual strip forming apparatus includes a first extruder and a second extruder, preferably arranged vertically in close proximity. The first extruder has an inlet for receiving a first tread compound, while the second extruder has an inlet for receiving a second tread compound. The first tread compound is extruded by the first extruder and then pumped by a first gear pump into a nozzle, while at the same time the second tread compound is extruded by the second extruder and then pumped by a second gear pump into the nozzle. The volume ratio of the second tread compound relative to the first tread compound in the tread may be changed by varying the ratio of the speed of gear pump of the first tread compound to the speed of gear pump of the second tread compound. The dual coextruded strip forming apparatus can adjust the speed ratios on the fly, and due to the small residence time of the co-extrusion nozzle, the apparatus has a fast response to a change in the compound ratios. This is due to the low volume of the co-extrusion zone.

EXAMPLES

Figure 5:
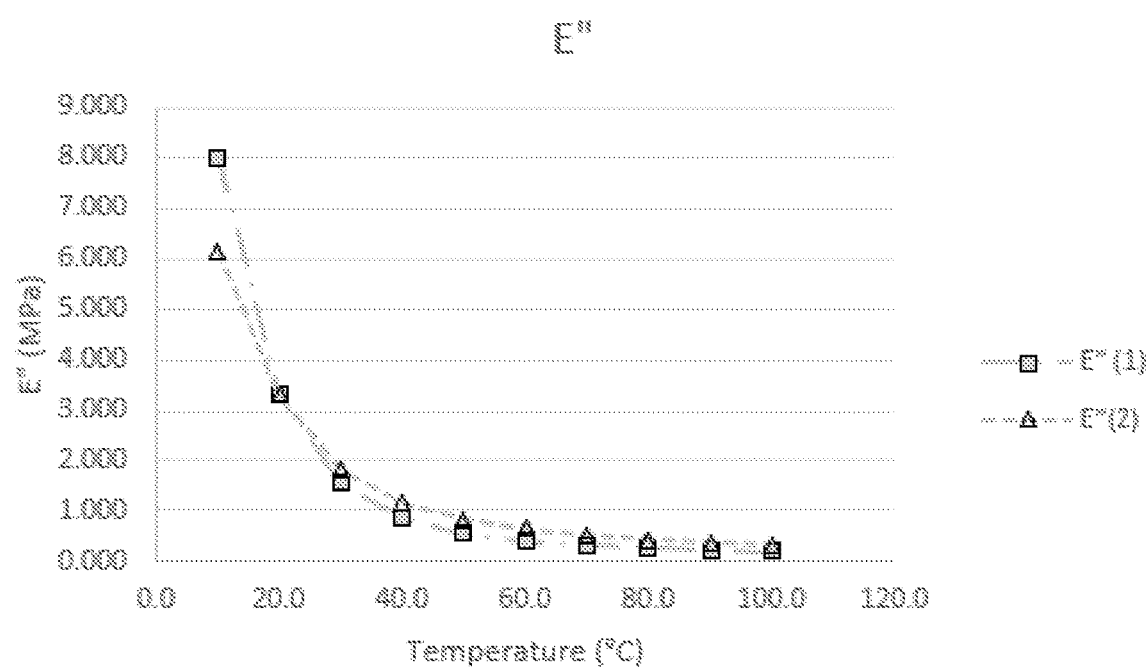
FIG. 5 shows the loss modulus E"(1) and E"(2) of the polymeric tread compounds of a pneumatic tire according to the present invention (wet conditions).

Pneumatic racing tires according to the present invention were prepared (inventive tires), in particular with a tread formed via an extrusion process of a dual-layer strip (having a bottom layer and a top layer—the top layer outer surface being the ground engaging surface of the tread) made of a second tread compound having a loss modulus E"(2), and the bottom layer being made of a first tread compound having a loss modulus E"(1), wherein, at a temperature of the tread of in the range of from 0 to 20° C., E"(1)>E"(2). The volume ratio of the second tread compound relative to the first tread compound in the tread is of more than 3:1, the first tread compound is a polymeric tread compound having a Tg of +3° C., the second tread compound is a polymeric tread compound having a Tg of −3° C. In this particular example, at a temperature of the tread of about 10° C., E"(1)=8.0 MPa and E"(2)=6.2 MPa (see FIG. 5).

Pneumatic racing tires not according to the present invention (reference tires) were prepared, in particular with a tread formed via an extrusion process of a mono-layer strip made of a tread compound having a loss modulus of 5.3 MPa at a temperature of the tread of about 10° C. The tread compound is a polymeric tread compound having a Tg of −3° C. The chemical composition of the tread compound of this comparative tire and the chemical composition of the second tread compound of the inventive tire are the same.

The inventive tires and comparative tires were mounted on different motorcycles for testing and comparison. The testing was done by professional pilots on circuit under wet conditions. The rating goes from 1 (very bad) to 10 (excellent).

TABLE 1

|  | Reference tires | Inventive tires |
|---|---|---|
| Air Temp. | 15° C. | 19° C. |
| Track Temp. | 15° C. | 21° C. |
| Tire Tread Temp.* | 48° C. | 60° C. |
| Tire pressure* | 1.39 bar | 1.49 bar |
| Total laps | 8 | 6 |
| Fastest Lap | 6th | 4th |
| Fastest Time | 2:02.299 (6th lap) | 1:52.911 (4th lap) |
| Rear entry stability | 5 | 7 |
| Rear entry grip | 5 | 7 |
| Rear mid corner grip | 5 | 7 |
| Rear exit grip | 5 | 7 |
| Rear exit stability | 5 | 7 |
| Rear slide control | 5 | 8 |
| Rear confidence | 5 | 7 |
| Rear overall | 5 | 7 |

*measured directly after the run

As may be taken from Table 1, the rating of the inventive tires is much better than the rating of the reference tires. Thanks to the tires of the present invention, the best performance are achieved faster. Indeed, already at the 4$^{th}$ lap, the fastest time is achieved for the inventive tires while it is at 6$^{th}$ lap that it is achieved with the tires not according to the present invention, and on top the best lap time for the inventive tires being significantly faster than the best lap time for the reference tires. As may be taken from Table 1 above, the tires according to the present invention exhibits great stability and grip performance. Furthermore, the tire reaches the optimum operating window much quicker and is able to maintain this optimum window despite significant cooling effects due to the water on track. Thus, it has been demonstrated that thanks to the dual-layer strip made of two tread compounds having different physical properties, here different loss modulus at temperature of the tread of maximum 20° C., the bottom layer generates a lot of heat which helps the top layer to reach its optimum temperature much quicker than usual. Thus, it permits to regulate properly the temperature of the tread to obtain the best performance in the operating window on wet circuit/track. This permits to be very flexible in terms of performance irrespective of the racing conditions.

FIG. 1 is a schematic representation of a portion of a dual-layer tread 10 comprised in the pneumatic tires according to the present invention, wherein said tread is made of a first layer 11 comprising a first tread compound having a first tread property (loss compliance LC(1) or loss modulus E"(1)) and a second layer 12 comprising a second tread compound having a second tread physical property ((loss compliance LC(2) or loss modulus E"(2)), the first layer and the second layer have been extruded together as a thin dual-layer strip which has been continuously spirally winding to form the dual-layer tread comprised in the pneumatic tires according to the present invention. The cross-sectional shape of the first layer is triangular and the second layer has an inverted triangular cross-sectional shape compared to the first layer. The volume ratio of the second tread compound relative to the first tread compound in the tread is preferably in the range of from 0.6:1 to 1.5:1.

FIG. 2 is a schematic representation of a portion of a dual-layer tread 100 comprised in the pneumatic tires according to the present invention, wherein said tread is made of a first layer 101 comprising a first tread compound having a first tread property (loss compliance LC(1) or loss modulus E"(1)) and a second layer 102 comprising a second tread compound having a second tread physical property ((loss compliance LC(2) or loss modulus E"(2)), the first tread compound and the second tread compound have been extruded together as a thin dual-layer strip which has been continuously spirally winding to form the dual-layer tread comprised in the pneumatic tires according to the present invention. The cross-sectional shape of the first layer is trapezoidal and the cross-sectional shape of the second layer is also trapezoidal. The volume ratio of the second tread compound relative to the first tread compound in the tread is in the range of from 2:1 to 9:1.

Figure 3:
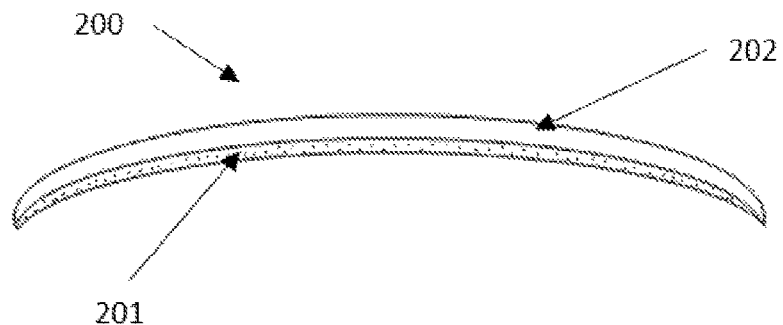
FIG. 3 is a schematic representation of a portion of a dual-layer tread 200 comprised in a pneumatic tire according to the present invention.
Figure 4:
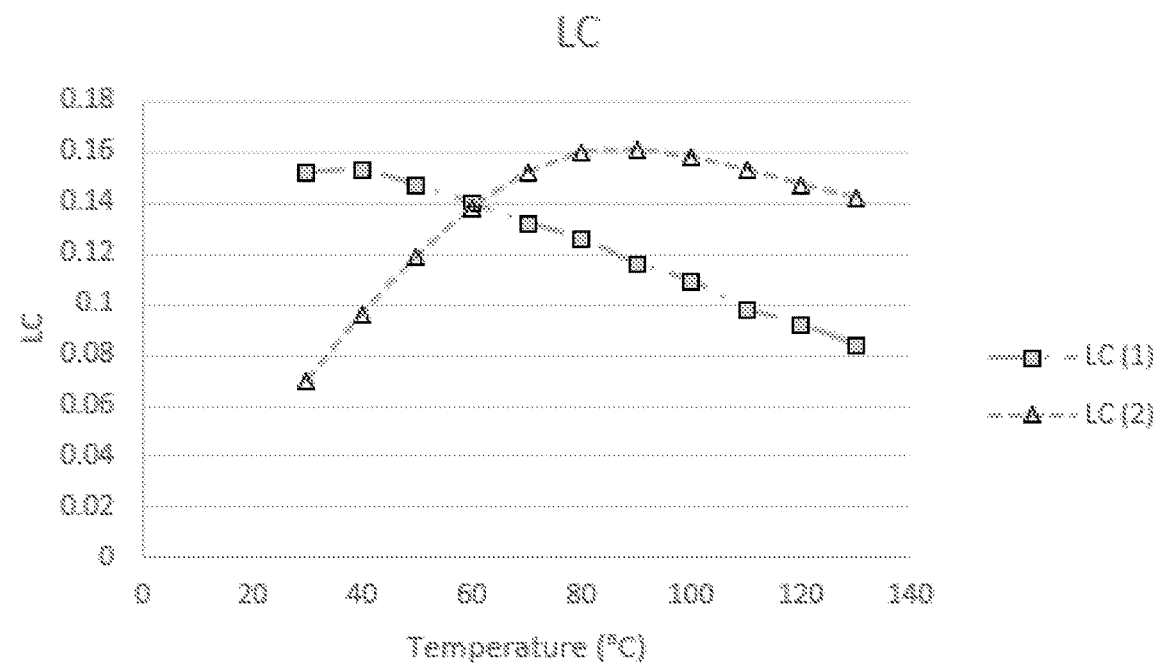
FIG. 4 shows the loss compliance LC(1) and LC(2) of the polymeric tread compounds of a pneumatic tire according to the present invention (dry conditions).

FIG. 3 is a schematic representation of a portion of a dual-layer tread 200 comprised in the pneumatic tires according to the present invention, wherein said tread is made of a first (bottom) layer 201 comprising a first tread compound having a first tread property (loss compliance LC(1) or loss modulus E"(1)) and a second (top) layer 202 comprising a second tread compound having a second tread physical property ((loss compliance LC(2) or loss modulus E"(2)). The first tread compound and the second tread compound have been co-extruded to form a large dual-layer strip, the width of the strip being the width of the tread.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

The invention claimed is:

1. A pneumatic tire comprising a tread with a ground engaging surface, the tread being a dual-layer tread made of
   a first layer comprising a first tread compound having a loss compliance LC(1);
   a second layer comprising a second tread compound having a loss compliance LC(2);
   wherein both of the loss compliance LC(1) and LC(2) are determined by a dynamic mechanical analysis system at a frequency of 10 Hz, under pre-strain of 10% and dynamic strain of 2.5% within a temperature sweep from 0 to 130° C.;
   wherein, when the tread temperature is in the range of from 5 to 50° C., LC(1) >LC(2);
   wherein the volume ratio of the second tread compound relative to the first tread compound in the tread is in the range of from 0.5:1 to 10:1.

2. The pneumatic tire of claim 1, wherein the second tread compound is a polymeric compound having a glass-transition temperature Tg(2) in the range of from −10 to 15° C.

3. The pneumatic tire of claim 1 or 2, wherein the dry traction of the second tread compound is higher than the dry traction of the first tread compound.

4. The pneumatic tire of claim 1, wherein the dual-layer tread is formed by extruding the first tread compound and the second tread compound one after the other.

5. The pneumatic tire of claim 1, wherein the volume ratio of the second tread compound relative to the first tread compound in the tread is in the range of from 0.60:1 to 10:1.

6. The pneumatic tire of claim 1, being a racing tire.

7. The pneumatic tire of claim 1, wherein the tread is formed by extruding the first tread compound with the second tread compound forming a dual-layer strip.

8. The pneumatic tire of claim 7, wherein the dual-layer tread is formed by a continuous spiral winding of the dual-layer strip.

9. The pneumatic tire of claim 1, wherein the cross-sectional shape of the first layer is substantially triangular, preferably triangular.

10. The pneumatic tire of claim 9, wherein the second layer has an inverted substantially triangular cross-sectional shape compared to the first layer, preferably an inverted triangular cross-sectional shape compared to the first layer.

11. The pneumatic tire of claim 9, wherein the volume ratio of the second tread compound relative to the first tread compound in the tread is in the range of from 0.6:1 to 1.5:1.

12. The pneumatic of claim 11, wherein the outermost surface of the first layer is a first ground engaging surface and the outermost surface of the second layer being is a second ground engaging surface, the first ground engaging surface and the second ground engaging surface forming the ground engaging surface of the tread.

13. The pneumatic tire of claim 1, wherein the cross-sectional shape of the first layer is substantially trapezoidal, preferably trapezoidal.

14. The pneumatic of claim 13, wherein the outermost surface of the second layer is the ground engaging surface of the tread, the first layer not having a ground engaging surface.

15. The pneumatic tire of claim 13, wherein the cross-sectional shape of the second layer is substantially trapezoidal, preferably trapezoidal.

16. The pneumatic tire of claim 13, wherein the volume ratio of the second tread compound relative to the first tread compound in the tread is in the range of from 2:1 to 9:1.

17. The pneumatic of claim 16, wherein the outermost surface of the first layer is a first ground engaging surface and the outermost surface of the second layer being is a second ground engaging surface, the first ground engaging surface and the second ground engaging surface forming the ground engaging surface of the tread.

* * * * *